(12) United States Patent
Yokohama et al.

(10) Patent No.: US 9,550,949 B2
(45) Date of Patent: Jan. 24, 2017

(54) GASIFICATION APPARATUS

(71) Applicant: MITSUBISHI HEAVY INDUSTRIES, LTD., Tokyo (JP)

(72) Inventors: Katsuhiko Yokohama, Tokyo (JP); Masashi Kitada, Tokyo (JP); Osamu Shinada, Tokyo (JP); Fumihiro Chuman, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 93 days.

(21) Appl. No.: 14/391,909

(22) PCT Filed: Apr. 12, 2013

(86) PCT No.: PCT/JP2013/061035
§ 371 (c)(1),
(2) Date: Oct. 10, 2014

(87) PCT Pub. No.: WO2013/157493
PCT Pub. Date: Oct. 24, 2013

(65) Prior Publication Data
US 2015/0059661 A1    Mar. 5, 2015

(30) Foreign Application Priority Data

Apr. 16, 2012  (JP) .................................. 2012-093136

(51) Int. Cl.
  *C10J 3/74* (2006.01)
  *C10J 3/48* (2006.01)
  (Continued)

(52) U.S. Cl.
CPC .. *C10J 3/48* (2013.01); *C10J 3/86* (2013.01); *F01K 23/067* (2013.01);
(Continued)

(58) Field of Classification Search
CPC ... C10J 2300/093; C10J 2200/09; C10J 3/482; C10J 3/74; Y02E 20/18; B01J 2219/2404
(Continued)

(56) References Cited

U.S. PATENT DOCUMENTS 3,530,835 A * 9/1970 von Wiesenthal ...... F22B 37/36
            122/494
4,395,268 A * 7/1983 Zabelka ..................... C10J 3/86
            122/235.12
(Continued)

FOREIGN PATENT DOCUMENTS

| CN | 101935553 | 1/2011 |
|----|-----------|--------|
| CN | 202092088 | 12/2011 |

(Continued)

OTHER PUBLICATIONS

Chinese Office Action issued Oct. 23, 2015 in corresponding Chinese Patent Application No. 201380019779.5 with English translation.
(Continued)

*Primary Examiner* — Gregory A Wilson
(74) *Attorney, Agent, or Firm* — Wenderoth, Lind & Ponack, L.L.P.

(57) ABSTRACT

In a gasification apparatus, a gasification furnace (101) having an octagonal hollow cross-sectional shape, a heat exchanger (102) having a quadrangular hollow cross-sectional shape, and a connection portion (103) which connects an upper portion of the gasification furnace (101) to a lower portion of the heat exchanger (102) are provided, thereby simplifying structures and enhancing efficiencies can be achieved.

10 Claims, 5 Drawing Sheets

(51) Int. Cl.
*C10J 3/86* (2006.01)
*F22D 1/02* (2006.01)
*F01K 23/06* (2006.01)
*F22B 1/18* (2006.01)

(52) U.S. Cl.
CPC .............. *F22B 1/1846* (2013.01); *F22D 1/02* (2013.01); *C10J 3/485* (2013.01); *C10J 2200/09* (2013.01); *Y02E 20/16* (2013.01); *Y02E 20/18* (2013.01)

(58) Field of Classification Search
USPC ............ 122/450, 420; 48/67, 69, 128, 197 R
See application file for complete search history.

(56) References Cited

U.S. PATENT DOCUMENTS

| | | | | |
|---|---|---|---|---|
| 5,676,713 | A | 10/1997 | Nakamura et al. | |
| 5,824,121 | A * | 10/1998 | Kowoll | C10J 3/86 422/205 |
| 9,103,234 | B2 * | 8/2015 | Gu | C10J 3/482 |
| 2005/0109603 | A1 * | 5/2005 | Graham | C10J 3/20 201/25 |
| 2007/0144712 | A1 * | 6/2007 | Koyama | F22B 1/18 165/129 |
| 2012/0305847 | A1 | 12/2012 | Von Kossak-Glowczewski | |
| 2013/0312946 | A1 * | 11/2013 | Chan | F28D 7/12 165/281 |

FOREIGN PATENT DOCUMENTS

| | | |
|---|---|---|
| EP | 0 645 442 | 3/1995 |
| JP | 61-221294 | 10/1986 |
| JP | 61-243895 | 10/1986 |
| JP | 7-97579 | 4/1995 |
| JP | 8-302364 | 11/1996 |
| JP | 2011-68812 | 4/2011 |
| WO | 2011/089140 | 7/2011 |

OTHER PUBLICATIONS

Japanese Decision of a Patent Grant mailed Mar. 17, 2015 in corresponding Japanese Application No. 2012-093136 with partial English translation.
Concise explanation of JP 61-221294 having a publication date of Oct. 1, 1986.
English translation of the Written Opinion of the International Searching Authority issued Jun. 11, 2013 in International (PCT) Application No. PCT/JP2013/061035.
International Search Report issued Jun. 11, 2013 in International (PCT) Application No. PCT/JP2013/061035.
Korean Notice of Allowance issued Feb. 25, 2016, in corresponding Korean Patent Application No. 10-2014-7028616, with English translation.
Notification of Completion of Formalities for Registration issued May 4, 2016 in corresponding Chinese Application No. 201380019779.5, with English translation.
Notification of Grant of Invention Patent issued May 4, 2016 in corresponding Chinese Application No. 201380019779.5, with English translation.

* cited by examiner

GASIFICATION APPARATUS

FIELD

The present invention relates to a gasification apparatus which produces a gas fuel by burning coal, biomass, and the like to be turned into gas.

BACKGROUND

For example, an integrated coal gasification combined cycle facility is a power generation facility which gasifies coal and is combined with combined cycle power generation for the purpose of an increase in efficiency and higher environmental properties compared to conventional coal-fired thermal power. It is known that the integrated coal gasification combined cycle facility has an advantage of using coal which is an abundant resource and has a further advantage through expansion of applied coal types.

A conventional integrated coal gasification combined cycle facility generally includes a coal feeding apparatus, a drying apparatus, a coal gasification apparatus, a gas refining apparatus, a gas turbine facility, a steam turbine facility, a heat recovery steam generator, a gas purifying apparatus, and the like. Therefore, coal is crushed after being dried and is supplied to the coal gasification apparatus as fine coal, and air is supplied so that the coal is turned into combustion gas by the coal gasification apparatus, thereby producing product gas (combustible gas). In addition, the product gas is refined and is supplied to the gas turbine facility to be burned. As a result, high-temperature and high-pressure combustion gas is produced to drive turbines. Exhaust gas after driving the turbines is subjected to thermal energy recovery by the heat recovery steam generator. Subsequently, steam is produced and is supplied to the steam turbine facility to drive turbines. Accordingly, power generation is achieved. On the other hand, the exhaust gas from which thermal energy is recovered is subjected to removal of harmful substances by the gas purifying apparatus, and is thereafter emitted to the air via a stack.

By the way, the coal gasification apparatus includes a gasification furnace and a heat exchanger (gas cooler). The gasification furnace burns the supplied coal (fine coal) using compressed air (oxygen) to turn the coal into gas, thereby producing combustible gas (coal gas). The heat exchanger cools the combustible gas produced in the gasification furnace. The gasification furnace and the heat exchanger are generally installed to be adjacent to each other, and the combustible gas produced in the gasification furnace is sent to the heat exchanger through a pipe and is cooled.

However, separately installing the gasification furnace and the heat exchanger as the coal gasification apparatus and connecting the two by the pipe lead to problems in that the overall structure is increased in size and the installation cost is increased. As a solution to the problems, there is a coal gasification apparatus described in Japanese Patent Publication No. 61-221294 as follows. In the coal gasification apparatus described in Japanese Patent Publication No. 61-221294, a heat exchanger is directly formed on the upper portion of the gasification furnace to be continuous.

Technical Problem

In the coal gasification apparatus according to the related art described above, the heat exchanger is disposed on the upper portion of the gasification furnace to be integrated with each other. In this case, since the functions of the gasification furnace and the heat exchanger are different from each other, it is difficult to enhance gasification efficiency and heat exchange efficiency.

SUMMARY

In order to solve the above-described problems, an object of the present invention is to provide a gasification apparatus capable of simplifying structures and enhancing efficiencies.

Solution to Problem

According to an aspect of the present invention, a gasification apparatus that produces a gas fuel by burning and gasifying a fuel, includes: a gasification furnace having a polygonal hollow cross-sectional shape with six or more vertices; a heat exchanger having a quadrangular hollow cross-sectional shape; and a connection portion which connects an upper portion of the gasification furnace to a lower portion of the heat exchanger.

Therefore, since the gasification furnace has a polygonal hollow cross-sectional shape with six or more vertices, heat generated by burning the fuel is transferred to the wall portions and radiant heat therefrom is appropriately applied to the fuel. Accordingly, unevenness in heating of the fuel can be suppressed. In addition, since the heat exchanger has the quadrangular hollow cross-sectional shape, the heat exchanger tubes and the like can be efficiently arranged. In addition, since the gasification furnace and the heat exchanger are connected to each other by the connection portion, the entirety thereof can be configured as a single container. Accordingly, the structure can be simplified, and gasification efficiency and heat exchange efficiency can be enhanced.

Advantageously, in the gasification apparatus, at least two wall portions included in the gasification furnace are arranged to be parallel to two wall portions included in the heat exchanger.

Therefore, since the wall portions of the gasification furnace and the wall portions of the heat exchanger are arranged to be parallel to each other, the gasification furnace can uniformly receive the load of the heat exchanger with a good balance in the circumferential direction. Accordingly, the buckling of the gasification furnace can be prevented, and an increase in the size of the gasification furnace can be suppressed.

Advantageously, in the gasification apparatus, a pressure container having a hollow shape is disposed on outsides of the gasification furnace, the connection portion, and the heat exchanger, and an outer surface of the gasification furnace is supported by an inner surface of the pressure container.

Therefore, the burners which eject the fuel, air, and the like to the inside are provided penetrating through the pressure container and the gasification furnace, and the gasification furnace is supported by the pressure container. Accordingly, an adverse effect on the burners by thermal expansion from the gasification furnace as the start point in the vertical direction due to the heating can be suppressed.

Advantageously, in the gasification apparatus, an upper end portion of the heat exchanger is connected to the pressure container by an expansion joint, and a lower end portion of the gasification furnace is sealed by stored water of a slag hopper provided in the pressure container.

Therefore, even when expansion occurs in the vertical direction from the gasification furnace as the start point due to the heating, the expansion of the heat exchanger is absorbed by the expansion joint, and the expansion of the lower end portion of the gasification furnace is absorbed by the stored water, thereby reducing stress applied to the pressure container.

Advantageously, in the gasification apparatus, the gasification furnace, the connection portion, and the heat exchanger are configured to include a plurality of heat exchanger tubes in which wall portions extend in a vertical direction and are arranged in a row in a circumferential direction.

Therefore, since the gasification furnace, the connection portion, and the heat exchanger are configured to include the heat exchanger tubes that are vertically continuous, the structure can be simplified. In addition, a heat exchange medium is moved toward the heat exchanger from the gasification furnace through each of the heat exchanger tubes, and thus the gasification efficiency and the heat exchange efficiency can be enhanced.

Advantageously, in the gasification apparatus, the heat exchanger has a plurality of heat exchange units arranged along a vertical direction, and at least the heat exchange unit disposed at the lowest position is hung from and supported by a beam member fixed to an upper end wall portion via a hanging tool.

Therefore, since the heat exchange units, which are close to the gasification furnace and thus are disposed in a relatively high temperature region, are suspended from and supported by the upper end wall portion, heat damage of the heat exchange units and the support portions thereof can be suppressed.

Advantageously, in the gasification apparatus, the hanging tool is configured to include cooling pipes through which a cooling medium flows.

Therefore, by using the cooling pipes as the hanging tools, the hanging tools can be cooled by the cooling medium, and thus heat damage of the heat exchange units and the support portions thereof can be suppressed.

Advantageously, in the gasification apparatus, the plurality of heat exchange units include an economizer, a superheater, and an evaporator, and the cooling pipes include a water supply pipe to the economizer, a heat exchanger tube of the evaporator, or a heat exchanger tube that forms the wall portions.

Therefore, since the cooling pipes includes a water supply pipe included in the heat exchanger or the heat exchanger tubes, an additional cooling water source or cooling pipes do not need to be provided. Consequently, an increase in the manufacturing cost can be suppressed.

Advantageous Effects of Invention

According to the gasification apparatus of the present invention, the gasification furnace having a polygonal hollow cross-sectional shape with six or more vertices, the heat exchanger having the quadrangular hollow cross-sectional shape, and the connection portion which connects the upper portion of the gasification furnace to the lower portion of the heat exchanger are provided. Therefore, the entirety thereof can be configured as a single container. Accordingly, the structure can be simplified, and gasification efficiency and heat exchange efficiency can be enhanced.

DESCRIPTION OF EMBODIMENTS

Hereinafter, exemplary embodiments of a gasification apparatus according to the present invention will be described in detail, with reference to the accompanying drawings. Note that the invention is not limited by the embodiments. In a case where a number of embodiments are present, the invention includes the configuration of a combination of the embodiments.

First Embodiment

Figure 1:
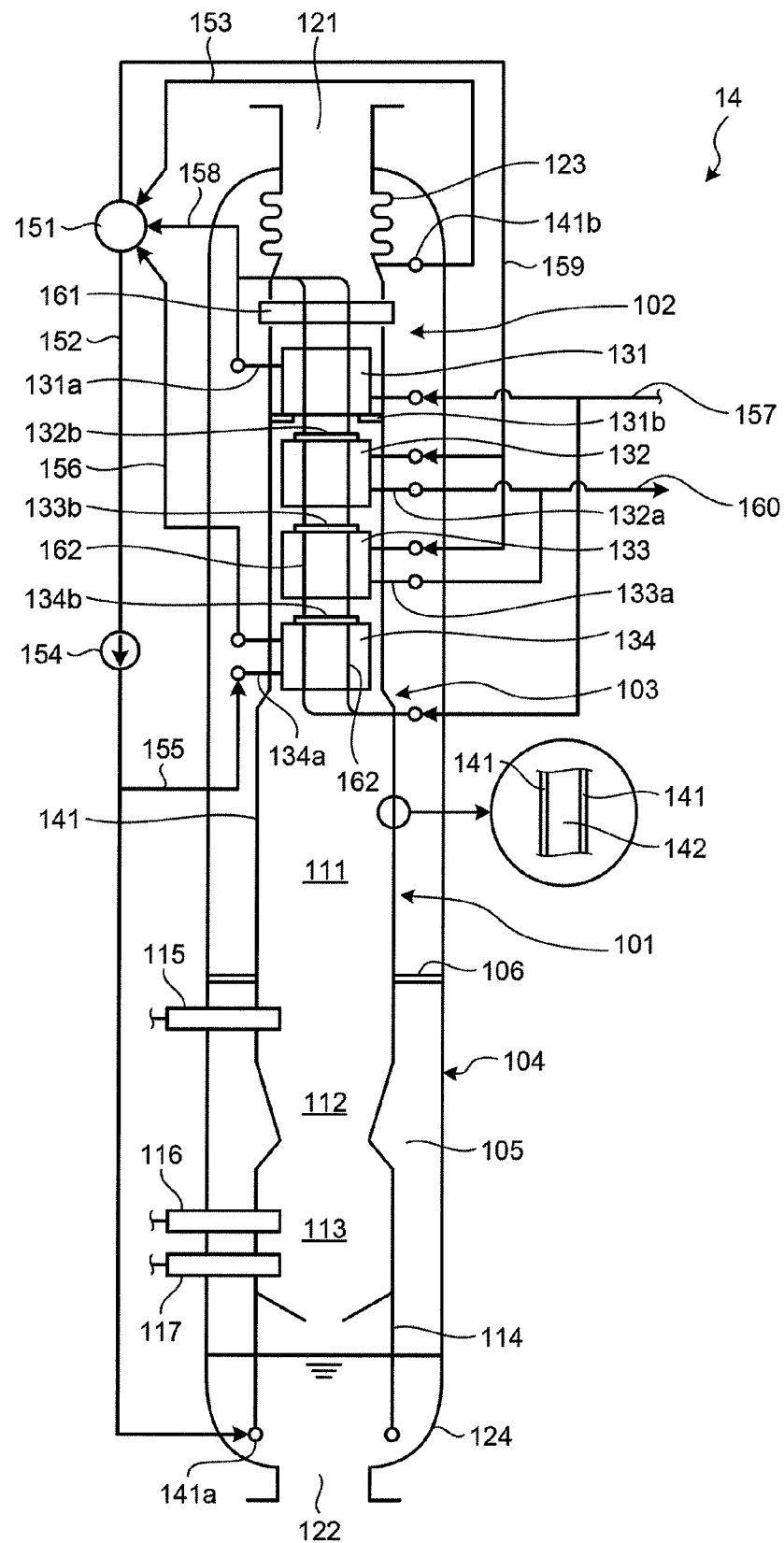
FIG. 1 is a schematic view illustrating a gasification apparatus according to a first embodiment of the present invention.
Figure 2:
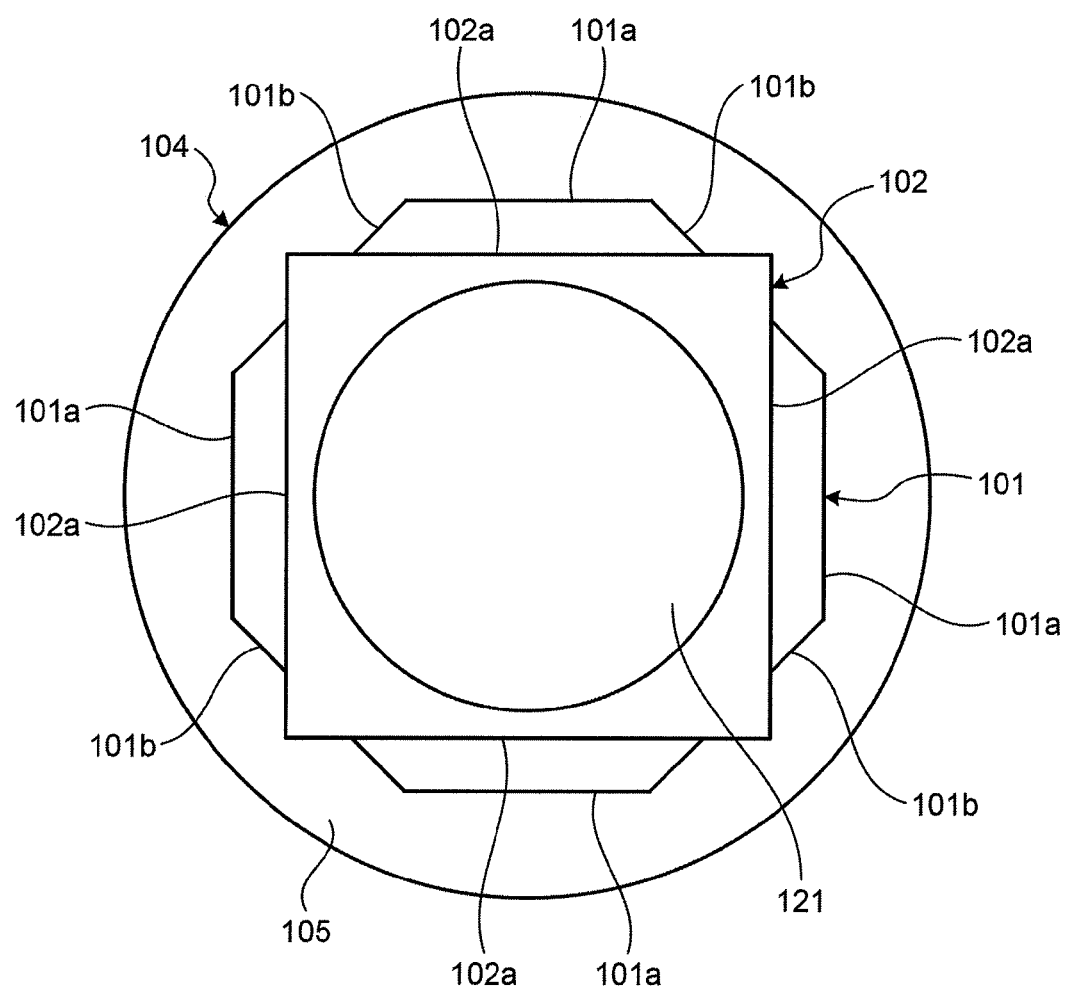
FIG. 2 is a schematic plan view illustrating the gasification apparatus of the first embodiment.
Figure 3:
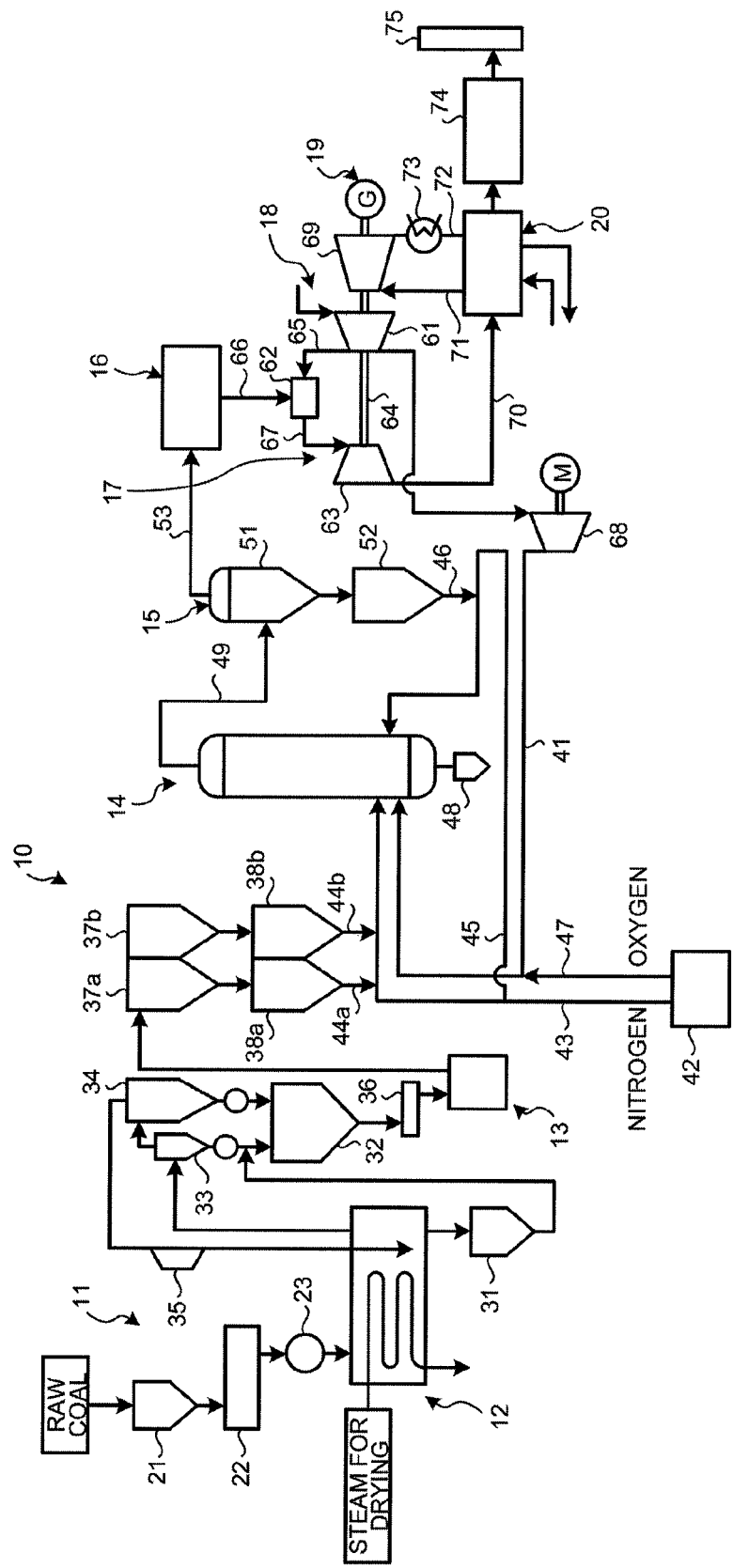
FIG. 3 is a schematic configuration diagram of an integrated coal gasification combined cycle facility to which the gasification apparatus of the first embodiment is applied.

FIG. 1 is a schematic view illustrating a gasification apparatus according to a first embodiment of the present invention. FIG. 2 is a schematic plan view illustrating the gasification apparatus of the first embodiment. FIG. 3 is a schematic configuration diagram of an integrated coal gasification combined cycle facility to which the gasification apparatus of the first embodiment is applied.

The integrated coal gasification combined cycle (IGCC) facility employs an air combustion type in which coal gas is produced by a gasification apparatus using air as an oxidizing agent, and generates power by supplying the coal gas that is refined by a gas refining apparatus into a gas turbine facility as fuel gas. That is, the integrated coal gasification combined cycle facility of the first embodiment is an air combustion type (air blowing) power generation facility.

In the first embodiment, as illustrated in FIG. 3, an integrated coal gasification combined cycle facility 10 includes a coal feeding apparatus 11, a fluidized bed drying apparatus 12, a coal pulverizer (mill) 13, a coal gasification apparatus 14, a char recovery unit 15, a gas refining apparatus 16, a gas turbine facility 17, a steam turbine facility 18, a generator 19, and a heat recovery steam generator (HRSG) 20.

The coal feeding apparatus 11 includes a raw coal bunker 21, a coal supplier 22, and a crusher 23. The raw coal bunker 21 can store coal and can drop a predetermined amount of coal to the coal supplier 22. The coal supplier 22 can transport the coal dropped from the raw coal bunker 21 using a conveyor or the like, and subsequently drop the coal to the crusher 23. The crusher 23 can crush the dropped coal into predetermined sizes.

The fluidized bed drying apparatus 12 supplies steam for drying (superheated steam) to the coal injected by coal feeding apparatus 11 to heat and dry the coal while fluidizing the coal, thereby removing moisture contained in the coal. In addition, the fluidized bed drying apparatus 12 is provided with a cooler 31 which cools the dried coal taken out from the lower portion, and the dried coal which is dried and cooled is stored in a dried coal bunker 32. Further, the fluidized bed drying apparatus 12 is provided with a dried coal cyclone 33 and a dried coal electrostatic precipitator 34 which separate particles of the dried coal from the steam taken out from the upper portion, and the particles of the dried coal separated from the steam are stored in the dried coal bunker 32. The steam from which the dried coal is separated by the dried coal electrostatic precipitator 34 is compressed by a steam compressor 35 and is then supplied to the fluidized bed drying apparatus 12 as the steam for drying.

The coal pulverizer 13 is a coal pulverizing machine and pulverizes the coal (dried coal) dried by the fluidized bed drying apparatus 12 into fine particles, thereby producing fine coal. That is, the dried coal stored in the dried coal bunker 32 is dropped to the coal pulverizer 13 by a coal supplier 36 such that the dried coal is pulverized into coal having a predetermined particle size or less, that is, fine coal. In addition, the fine coal pulverized by the coal pulverizer 13 is separated from gas for transportation by fine coal bag filters 37a and 37b and is stored in fine coal supply hoppers 38a and 38b.

The coal gasification apparatus 14 can supply the fine coal processed by the coal pulverizer 13 and can return char (unburned components of the coal) recovered by the char recovery unit 15, which make it possible to recycle the char.

That is, a compressed air supply line 41 from the gas turbine facility 17 (compressor 61) is connected to the coal gasification apparatus 14, which makes it possible to supply compressed air compressed by the gas turbine facility 17. An air separating apparatus 42 separates air in the atmosphere to produce nitrogen and oxygen. A first nitrogen supply line 43 is connected to the coal gasification apparatus 14, and coal supply lines 44a and 44b from the fine coal supply hoppers 38a and 38b are connected to the first nitrogen supply line 43. In addition, a second nitrogen supply line 45 is also connected to the coal gasification apparatus 14, and a char return line 46 from the char recovery unit 15 is connected to the second nitrogen supply line 45. Furthermore, an oxygen supply line 47 is connected to the compressed air supply line 41. In this case, nitrogen is used as gas for transporting the coal or the char, and oxygen is used as an oxidizing agent.

The coal gasification apparatus 14 has, for example, an entrained bed type gasification furnace having two stages and two chambers, and burns and gasifies the supplied coal, char, air (oxygen), or steam as a gasifying agent. Along with this process, combustible gas (product gas, coal gas) which mainly contains carbon dioxide is produced such that a gasification reaction is caused by the combustible gas as a gasifying agent. The coal gasification apparatus 14 is provided with a foreign matter removing device 48 which removes foreign matter incorporated into the fine coal. In this case, the coal gasification apparatus 14 is not limited to the entrained bed gasification furnace and may be a fluid bed gasification furnace or a fixed bed gasification furnace. The coal gasification apparatus 14 is provided with a gas production line 49 for the combustible gas, which is directed to the char recovery unit 15, so that the combustible gas including char can be discharged thereto. In this case, it is preferable that a gas cooler is provided in the gas production line 49 so that the combustible gas can be supplied to the char recovery unit 15 after the combustible gas is cooled to a predetermined temperature.

The char recovery unit 15 includes a dust collecting device 51 and a supply hopper 52. In this case, the dust collecting device 51 includes a single or a plurality of bag filters or cyclones and thus can separate char contained in the combustible gas produced by the coal gasification apparatus 14. In addition, the combustible gas from which char is separated is sent to the gas refining apparatus 16 through a gas discharge line 53. The supply hopper 52 stores the char separated from the combustible gas by the dust collecting device 51. Note that a bottle may be disposed between the dust collecting device 51 and the supply hopper 52, and a plurality of supply hoppers 52 may be configured to be connected to the bottle. In addition, the char return line 46 from the supply hopper 52 is connected to the second nitrogen supply line 45.

The gas refining apparatus 16 performs gas refining by removing impurities such as sulfur compounds and nitrogen compounds from the combustible gas from which the char is separated by the char recovery unit 15. In addition, the gas refining apparatus 16 refines the combustible gas to produce fuel gas and supplies the fuel gas to the gas turbine facility 17. In the gas refining apparatus 16, a sulfur component ($H_2S$) is still contained in the combustible gas from which the char is separated. Therefore, the sulfur component is removed by an amine absorbent to be finally recovered as gypsum for effective use.

The gas turbine facility 17 includes a compressor 61, a combustor 62, and a turbine 63. The compressor 61 and the turbine 63 are connected by a rotating shaft 64. A compressed air supply line 65 from the compressor 61 is connected to the combustor 62, and a fuel gas supply line 66 from the gas refining apparatus 16 is connected to the combustor 62. A combustion gas supply line 67 is connected to the turbine 63. Furthermore, the gas turbine facility 17 is provided with the compressed air supply line 41 that extends from the compressor 61 to the coal gasification apparatus 14. At an intermediate portion thereof, a booster 68 is provided. Therefore, the combustor 62 mixes the compressed air supplied from the compressor 61 and the fuel gas supplied from the gas refining apparatus 16, and burns the mixture. The turbine 63 rotates the rotating shaft 64 by the produced combustion gas, thereby driving the generator 19.

The steam turbine facility 18 includes a turbine 69 connected to the rotating shaft 64 in the gas turbine facility 17, and the generator 19 is connected to the base end portion of the rotating shaft 64. The heat recovery steam generator 20 is provided with a flue gas line 70 from the gas turbine facility 17 (the turbine 63) and produces steam through heat exchange between air and flue gas at high temperature. Accordingly, a steam supply line 71 is provided between the heat recovery steam generator 20 and the turbine 69 of the steam turbine facility 18, a steam recovery line 72 is also provided therebetween, and a condenser 73 is provided in the steam recovery line 72. Therefore, in the steam turbine facility 18, the turbine 69 is driven by the steam supplied from the heat recovery steam generator 20 to rotate the rotating shaft 64, thereby driving the generator 19.

In addition, the flue gas from which heat is recovered by the heat recovery steam generator 20 is subjected to removal of harmful substances by a gas purifying apparatus 74, and the purified flue gas is emitted to the atmosphere from a stack 75.

Here, the operations of the integrated coal gasification combined cycle facility 10 of the first embodiment will be described.

In the integrated coal gasification combined cycle facility 10 of the first embodiment, in the coal feeding apparatus 11, raw coal (coal) is stored in the raw coal bunker 21, and the coal in the raw coal bunker 21 is dropped to the crusher 23 by the coal supplier 22 to be crushed into predetermined sizes. Subsequently, the crushed coal is heated and dried by the fluidized bed drying apparatus 12. The coal is thereafter cooled by the cooler 31 and is then stored in the dried coal bunker 32. Furthermore, particles of the dried coal are separated from steam taken out from the upper portion of the fluidized bed drying apparatus 12 by the dried coal cyclone 33 and the dried coal electrostatic precipitator 34. The steam is compressed by the steam compressor 35 and is then returned to the fluidized bed drying apparatus 12 as the steam for drying. On the other hand, the particles of the dried coal separated from the steam are stored in the dried coal bunker 32.

The dried coal stored in the dried coal bunker 32 is dropped to the coal pulverizer 13 by the coal supplier 36, and is pulverized into fine particles here to produce fine coal. The fine coal is stored in the fine coal supply hoppers 38a and 38b via the fine coal bag filters 37a and 37b. The fine coal stored in the fine coal supply hoppers 38a and 38b is supplied to the coal gasification apparatus 14, through the first nitrogen supply line 43, by the nitrogen supplied from the air separating apparatus 42. In addition, char recovered by the char recovery unit 15, which will be described later, is supplied to the coal gasification apparatus 14, through the second nitrogen supply line 45, by the nitrogen supplied from the air separating apparatus 42. Furthermore, the compressed air extracted by the gas turbine facility 17, which will be described later, is pressurized by the booster 68 and is thereafter supplied to the coal gasification apparatus 14 through the compressed air supply line 41 along with oxygen supplied from the air separating apparatus 42.

In the coal gasification apparatus 14, the supplied fine coal and the char are burned by the compressed air (oxygen) such that the fine coal and the char are gasified, thereby producing combustible gas (coal gas) mainly containing carbon dioxide. The combustible gas is then discharged from the coal gasification apparatus 14 through the gas production line 49 to be sent to the char recovery unit 15.

In the char recovery unit 15, the combustible gas is first supplied to the dust collecting device 51 such that char contained in the gas is separated from the combustible gas. The combustible gas from which the char is separated is then sent to the gas refining apparatus 16 through the gas discharge line 53. On the other hand, the fine char separated from the combustible gas is accumulated in the supply hopper 52 and is returned to the coal gasification apparatus 14 through the char return line 46 to be recycled.

In the gas refining apparatus 16, the combustible gas from which the char is separated by the char recovery unit 15 is subjected to gas refining through removal of impurities such as sulfur compounds and nitrogen compounds, thereby producing fuel gas. In addition, in the gas turbine facility 17, the compressor 61 produces compressed air and supplies the compressed air to the combustor 62. Subsequently, the combustor 62 mixes the compressed air supplied from the compressor 61 with the fuel gas supplied from the gas refining apparatus 16 and burns the mixture to produce combustion gas. The turbine 63 is driven by the combustion gas to drive the generator 19 via the rotating shaft 64, thereby generating power.

In addition, exhaust gas discharged from the turbine 63 in the gas turbine facility 17 is subjected to heat exchange with air in the heat recovery steam generator 20, thereby producing steam. The produced steam is supplied to the steam turbine facility 18. In the steam turbine facility 18, the turbine 69 is driven by the steam supplied from the heat recovery steam generator 20 to drive the generator 19 via the rotating shaft 64, thereby generating power.

Thereafter, in the gas purifying apparatus 74, harmful substances of the exhaust gas discharged from the heat recovery steam generator 20 are removed, and the purified flue gas is emitted to the air from the stack 75.

Hereinafter, the coal gasification apparatus 14 in the integrated coal gasification combined cycle facility 10 will be described in detail.

As illustrated in FIGS. 1 and 2, the coal gasification apparatus 14 includes a gasification furnace 101 having a polygonal hollow cross-sectional shape with six or more vertices, a heat exchanger 102 having a quadrangular hollow cross-sectional shape, and a connection portion 103 which connects the upper portion of the gasification furnace 101 to the lower portion of the heat exchanger 102. In addition, at least two wall portions included in the gasification furnace 101 are arranged to be parallel to two wall portions included in the heat exchanger 102.

The gasification furnace 101 includes a reductor portion 111, a diffuser portion 112, and a combustor portion 113 arranged in this order from top. The reductor portion 111 has an octagonal hollow cross-sectional shape, the combustor portion 113 has a triacontadigonal hollow cross-sectional shape. The diffuser portion 112 has a hollow cross-sectional shape for a transition from the octagonal hollow cross-section to the triacontadigonal hollow cross-section. In addition, the heat exchanger 102 has the quadrangular hollow cross-sectional shape, and the connection portion 103 has a hollow cross-sectional shape for a transition from the quadrangular hollow cross-section to the octagonal hollow cross-section.

In addition, in the first embodiment, the reductor portion 111 of the gasification furnace 101 has the octagonal hollow cross-sectional shape and the combustor portion 113 has the triacontadigonal hollow cross-sectional shape, but the first embodiment is not limited to these shapes. That is, the gasification furnace 101 (the reductor portion 111 and the combustor portion 113) may be other shapes as far as it has a polygonal hollow cross-sectional shape with six or more vertices, and preferably, a polygonal hollow cross-sectional shape with a multiple of four vertices. When the gasification furnace 101 has a polygonal hollow cross-sectional shape with a multiple of four vertices, four wall portions thereof are parallel to all (four) of the wall portions of the heat exchanger 102 having the quadrangular hollow cross-sectional shape.

That is, in the first embodiment, the reductor portion 111 of the gasification furnace 101 has a regular octagon shape in which passage walls (wall portions) 101a and 101b are alternately connected, and the heat exchanger 102 has a square shape in which passage walls (wall portions) 101a are connected. The reductor portion 111 of the gasification furnace 101 is connected to the heat exchanger 102 by the connection portion 103 so that the passage walls 101a and passage walls 102a are parallel to each other.

A pressure container 104 has a hollow cylindrical shape, and the upper end portion thereof is provided with a gas discharge port 121 and the lower end portion thereof is provided with a slag discharge port 122. In the pressure container 104, the gasification furnace 101, the connection portion 103, and the heat exchanger 102 are arranged. That is, on the outsides of the gasification furnace 101, the connection portion 103, and the heat exchanger 102, the pressure container 104 is disposed via a predetermined space 105. The outer surface of the reductor portion 111 in the gasification furnace 101 is supported to the inner surface of the pressure container 104 by a support portion 106.

In addition, the upper end portion of the heat exchanger 102 is connected to the upper end portion of the pressure container by an expansion joint 123 and communicates with the gas discharge port 121. The lower portion of the pressure container 104 is provided with a slag hopper 124, and in the gasification furnace 101. The lower end portion thereof, that is, a ring-shaped extension portion 114 being hung from the combustor portion 113 is immersed into stored water of the slag hopper 124 so as to be sealed by the water.

Furthermore, in the gasification furnace 101, a combustion device including a plurality of burners 115 that are arranged at equal intervals in the circumferential direction thereof is disposed in the reductor portion 111. The gasification furnace 101 also has two pairs of combustion devices including a plurality of burners 116 and 117 being arranged at equal intervals are disposed in the combustor portion 113. Each of the burners 115, 116, and 117 penetrates through the pressure container 104 and the gasification furnace 101 from the outside and is fixed substantially horizontally. In addition, the support portion 106 of the gasification furnace 101 is disposed above the burners 115. In this case, the position of the support portion 106 is not limited to the above and may also be provided in the diffuser portion 112 or the combustor portion 113. That is, the position is preferably in the vicinity of each of the burners 115, 116, and 117.

As illustrated in FIG. 3, the burners 115 are connected to a line where the first nitrogen supply line 43 meets the coal supply lines 44a and 44b. The burners 116 are connected to the char return line 46, and the burners 117 are connected to a line where the oxygen supply line 47 meets the compressed air supply line 41.

Meanwhile, in the heat exchanger 102, as a plurality of heat exchange units arranged along the vertical direction, an economizer 131, superheaters 132 and 133, and an evaporator 134 are arranged in this order from the top.

The gasification furnace 101, the connection portion 103, and the heat exchanger 102 are configured to include a plurality of heat exchanger tubes 141 in which the furnace walls extend in the vertical direction and are arranged in a row in the circumferential direction. Specifically, as the passage walls, the heat exchanger tubes 141 and fins 142 are alternately connected by welding, and the heat exchanger tubes 141 and the fins 142 are preferably made of stainless steel. In this case, the heat exchanger tubes 141 and the fins 142 form an octagonal cross-section in the gasification furnace 101 and form a quadrangular cross-section in the heat exchanger 102, and the gasification furnace 101 having the octagonal cross-section and the heat exchanger 102 having the quadrangular cross-section are connected to each other by the connection portion 103. The connection portion 103 connects the gasification furnace 101 to the heat exchanger 102 by changing the arrangement of the heat exchanger tubes 141, the shapes of the fins 142, the connection positions between the heat exchanger tubes 141 and the fins 142, and the like without changing the shapes of the heat exchanger tubes 141.

In addition, the gasification furnace 101, the connection portion 103, and the heat exchanger 102 are configured to include the same number of heat exchanger tubes 141 in which the furnace walls extend in the vertical direction. That is, each of the heat exchanger tubes 141 is provided to extend from the gasification furnace 101 to the heat exchanger 102 via the connection portion 103. The same heat exchanger tubes 141 extend vertically and are arranged in a row in the circumferential direction without cutting a part of the heat exchanger tube 141 and without adding other heat exchanger tubes, such that the furnace walls of the gasification furnace 101, the connection portion 103, and the heat exchanger 102 are formed.

In addition, the lower end portions of the plurality of heat exchanger tubes 141 are gathered at a header 141a, and the upper end portions thereof are gathered at a header 141b. A steam drum 151 is connected to the header 141a via a descending pipe 152 and is connected to the header 141b via an ascending pipe 153, and a circulating pump 154 is provided in the descending pipe 152. In addition, the descending pipe 152 is provided with a branch pipe 155, and the branch pipe 155 is connected to one end portion (inlet header) of a heat exchanger tube 134a of the evaporator 134. A delivery pipe 156 connected to the other end portion (outlet head) of the heat exchanger tube 134a thereof is connected to the steam drum 151.

A water supply pipe 157 from the outside is connected to one end portion (inlet head) of a heat exchanger tube 131a of the economizer 131, and a water pipe 158 connected to the other end portion (outlet header) of the heat exchanger tube 131a is connected to the steam drum 151. In addition, a steam pipe 159 from the steam drum 151 branches off to one end portions (inlet headers) of heat exchanger tubes 132a and 133a of the superheaters 132 and 133, and a steam discharge pipe 160 connected to the other end portions (outlet headers) of the heat exchanger tubes 132a and 133a is connected to a steam turbine (not illustrated).

In the heat exchanger 102, a beam member 161 is disposed above the economizer 131, and the end portion of the beam member 161 is connected to the furnace walls (the heat exchanger tubes 141 and the fins 142) by welding. In addition, the heat exchanger 102 is provided with a plurality of cooling pipes 162 as hanging tools along the vertical direction. While the lower end portions thereof are connected to the water supply pipe 157, the upper end portions thereof are supported by the beam member 161 and are then connected to the water pipe 158. Moreover, the two superheaters 132 and 133 and the evaporator 134 are hung from and supported by the plurality of cooling pipes 162 via hanging metal fittings 132b, 133b, and 134b. In addition, the economizer 131 is placed on and supported by a support plate 131b fixed to the furnace walls (the heat exchanger tubes 141 and the fins 142) by welding.

That is, the temperature of the heat exchanger 102 is increased toward the lower portion thereof close to the gasification furnace 101, and thus it is more difficult to retain welding durability. Therefore, the two superheaters 132 and 133 and the evaporator 134 positioned on the lower side are hung from the beam member 161 on the upper side via the plurality of cooling pipes 162, and the economizer 131 positioned on the upper side is placed on the support plate 131b welded to the furnace walls. In this case, according to the temperature conditions of the heat exchanger 102, the two superheaters 132 and 133 may also be placed on and supported by support plates by welding the support plates to the furnace walls.

Hereinafter, the operations of the coal gasification apparatus 14 of the present embodiment described above will be described.

In the coal gasification apparatus 14, while nitrogen and fine coal are injected into the gasification furnace 101 and are ignited by the burners 115, char and compressed air (oxygen) are injected and ignited by the burners 116 and 117. Then, in the combustor portion 113, high-temperature combustion gas is produced by the combustion of the fine coal and the char. In addition, in the combustor portion 113, molten slag is produced in high-temperature gas by the combustion of the fine coal and the char. The molten slag adheres to the furnace walls, drops onto the furnace bottom, and is finally discharged to the stored water in the slag hopper 124. Moreover, the high-temperature combustion gas produced in the combustor portion 113 passes through the diffuser portion 112 and ascends to the reductor portion 111. In the reductor portion 111, the fine coal is mixed with the high-temperature combustion gas and undergoes a gasification reaction in a high-temperature reducing atmosphere, thereby producing combustible gas (coal gas) mainly containing carbon dioxide.

At this time, water is fed into the economizer 131 from the water supply pipe 157, and the fed water is heated therein, and is thereafter sent to the steam drum 151 through the water pipe 158. The steam drum 151 sends the fed water to the lower portions of the plurality of heat exchanger tubes 141 as the furnace walls through the descending pipe 152 by the circulating pump 154, and sends the fed water to the evaporator 134 through the branch pipe 155. Moreover, when the fed water moves upward through the plurality of heat exchanger tubes 141, the gasification furnace 101, the connection portion 103, and the heat exchanger 102 are cooled, and the fed water is sent to the steam drum 151 through the ascending pipe 153. In addition, the evaporator 134 heats the fed water by the combustible gas that ascends in the heat exchanger 102 and sends the fed water in a steam-mixed state to the steam drum 151 through the delivery pipe 156.

In addition, the steam drum 151 performs steam separation and sends the steam to the superheaters 132 and 133 through the steam pipe 159 to be superheated. The superheaters 132 and 133 superheat the steam by the combustible gas that ascends in the heat exchanger 102 and sends the produced superheated steam to the steam turbine from the steam discharge pipe 160.

In the gasification apparatus of the first embodiment as described above, the gasification furnace 101 having the octagonal hollow cross-sectional shape, the heat exchanger 102 having the quadrangular hollow cross-sectional shape, and the connection portion 103 that connects the upper portion of the gasification furnace 101 to the lower portion of the heat exchanger 102 are provided.

Therefore, since the gasification furnace 101 has the octagonal hollow cross-sectional shape, heat generated by burning the fine coal is transferred to the wall portions, and radiant heat therefrom is appropriately applied to the fine coal. Accordingly, unevenness in heating of the fine coal can be suppressed. In addition, since the heat exchanger 102 has the quadrangular hollow cross-sectional shape, the heat exchanger tubes 141 and the like can be efficiently arranged. In addition, since the gasification furnace 101 and the heat exchanger 102 are connected to each other by the connection portion 103, the entirety thereof can be configured as a single container. Accordingly, the structure can be simplified, and gasification efficiency and heat exchange efficiency can be enhanced.

In this case, since the gasification furnace 101 has the octagonal hollow cross-sectional shape and the heat exchanger 102 has the quadrangular hollow cross-sectional shape, the four wall portions 101a and 102a thereof are arranged to be parallel to each other. Therefore, the gasification furnace 101 can uniformly receive the load of the heat exchanger 102 with a good balance in the circumferential direction. Accordingly, the buckling of the gasification furnace 101 can be prevented, and an increase in the size of the gasification furnace 101 can be suppressed.

In the gasification apparatus of the first embodiment, the pressure container 104 having a hollow shape is disposed on the outsides of the gasification furnace 101, the connection portion 103, and the heat exchanger 102. The outer surface of the gasification furnace 101 is supported by the inner surface of the pressure container 104. Therefore, the burners 115, 116, and 117 which eject the fine coal, air, and the like to the inside are provided to penetrate through the pressure container 104 and the gasification furnace 10. With the gasification furnace 101 being supported by the pressure container 104, the burners 115, 116, and 117 are neither redirected nor deformed by thermal expansion from the gasification furnace 101, as the start point in the vertical direction, due to the heating. Accordingly, an adverse effect on the burners 115, 116, and 117 can be suppressed.

In the gasification apparatus of the first embodiment, the upper end portion of the heat exchanger 102 is connected to the pressure container 104 via the expansion joint 123, and the lower end portion of the gasification furnace 101 is sealed by the stored water of the slag hopper 124 provided in the pressure container 104. Therefore, even when expansion occurs in the vertical direction from the gasification furnace 101 as the start point due to the heating, the expansion of the heat exchanger 102 is absorbed by the expansion joint 123, and the expansion of the lower end portion of the gasification furnace 101 is absorbed by the stored water, thereby reducing stress applied to the pressure container 104.

In the gasification apparatus of the first embodiment, the wall portions of the gasification furnace 101, the connection portion 103, and the heat exchanger 102 includes the plurality of heat exchanger tubes 141 and the fins 142 that extend in the vertical direction and are arranged in a row in the circumferential direction. Therefore, since the entirety thereof is constituted by the heat exchanger tubes 141 and the fins 142 that are vertically continuous, the structure can be simplified. In addition, cooling water is moved toward the heat exchanger 102 from the gasification furnace 101 through each of the heat exchanger tubes 141, and thus the gasification efficiency and the heat exchange efficiency can be enhanced.

In the gasification apparatus of the first embodiment, in the heat exchanger 102, as the plurality of heat exchange units arranged along the vertical direction, the economizer 131, the superheaters 132 and 133, and the evaporator 134 are arranged. The superheaters 132 and 133 and the evaporator 134 are hung from and suspended by the beam member 161 fixed to the upper end wall portion. Therefore, since the superheaters 132 and 133 and the evaporator 134, which are close to the gasification furnace 101 and thus are disposed in a relatively high temperature region, are suspended from and supported by the upper end wall portion, heat damage of the support portions of the superheaters 132 and 133 and the evaporator 134 can be suppressed.

In the gasification apparatus of the first embodiment, the cooling pipes 162 are suspended from and supported by the beam member 161, the water supply pipe 157 toward the economizer 131 is connected to the cooling pipes 162, and the superheaters 132 and 133 and the evaporator 134 are hung and supported by the cooling pipes 162. Therefore, by using the cooling pipes 162 as the hanging tools, the hanging metal fittings 132b, 133b, and 134b of the superheaters 132 and 133 and the evaporator 134 can be cooled by the cooling water, and thus damage by heat of the support portions can be suppressed. In addition, since the water supply pipe 157 toward the economizer 131 is connected to the cooling pipes 162, an additional cooling water source or cooling pipes do not need to be provided. Consequently, an increase in the manufacturing cost can be suppressed.

Second Embodiment

Figure 4:
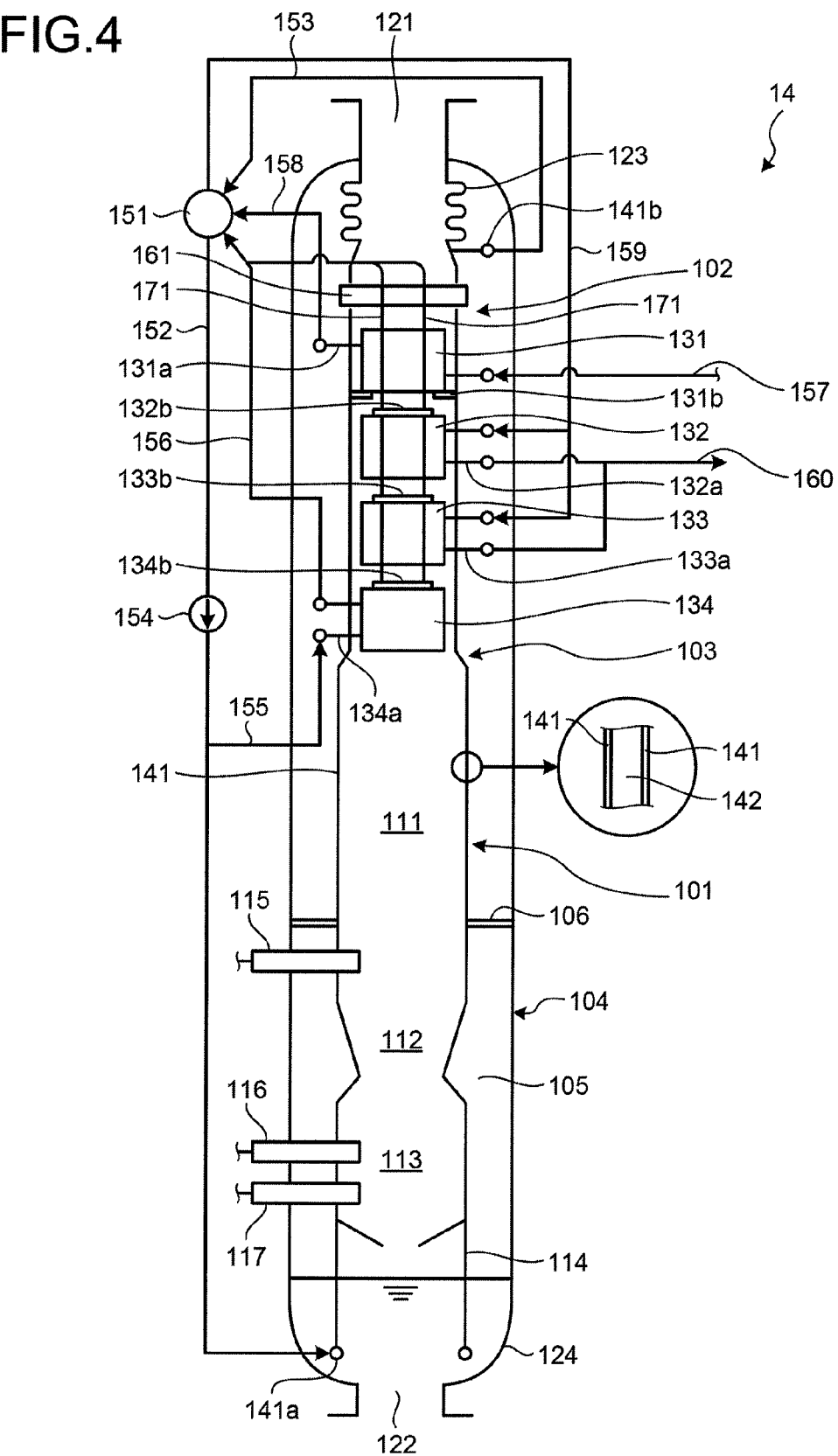
FIG. 4 is a schematic view illustrating a gasification apparatus according to a second embodiment of the present invention.

FIG. 4 is a schematic view illustrating a gasification apparatus according to a second embodiment of the present invention. Note that like elements having the same functions as those of the above-described embodiment are denoted by like reference numerals, and the detailed description thereof will not be repeated.

In the second embodiment, as illustrated in FIG. 4, in a coal gasification apparatus 14, a gasification furnace 101 and a heat exchanger 102 are configured to be connected to each other by a connection portion 103. The gasification furnace 101 includes a reductor portion 111 having an octagonal hollow cross-sectional shape, a diffuser portion 112, and a combustor portion 113 having a triacontadigonal hollow cross-sectional shape. The upper portion of the reductor portion 111 having the regular octagon shape in the gasification furnace 101 and the lower portion of the heat exchanger 102 having a square shape are connected to each other by the connection portion 103, and passage walls 101a and passage walls 102a (see FIG. 2) are parallel to each other.

On the outsides of the gasification furnace 101, the connection portion 103, and the heat exchanger 102, a pressure container 104 is disposed via a predetermined space 105, and the outer surface of the reductor portion 111 in the gasification furnace 101 is supported by the inner surface of the pressure container 104 using a support portion 106. The upper end portion of the heat exchanger 102 is connected to the upper end portion of the pressure container by an expansion joint 123, and the lower end portion of the gasification furnace 101 is immersed into the stored water of a slag hopper 124 so as to be sealed by the water.

In addition, in the heat exchanger 102, an economizer 131, superheaters 132 and 133, and an evaporator 134 are arranged in this order from the top along the vertical direction.

The gasification furnace 101, the connection portion 103, and the heat exchanger 102 are configured to include the plurality of fins 142 and the plurality of heat exchanger tubes 141 in which the furnace walls extend in the vertical direction and are arranged in a row in the circumferential direction. A steam drum 151 is connected to the lower portion of the heat exchanger tube 141 via a descending pipe 152 and is connected to the upper portion of the heat exchanger tube 141 via an ascending pipe 153. In addition, a branch pipe 155 from the descending pipe 152 is connected to a heat exchanger tube 134a of the evaporator 134 and is connected to the steam drum 151 via a delivery pipe 156. A water supply pipe 157 is connected to the heat exchanger tube 131a of the economizer 131 and is connected to the steam drum 151 via a water pipe 158. In addition, a steam pipe 159 from the steam drum 151 is connected to heat exchanger tubes 132a and 133a of the superheaters 132 and 133 and is connected to a steam turbine via a steam discharge pipe 160.

Furthermore, in the heat exchanger 102, a beam member 161 is disposed above the economizer 131, and the end portion of the beam member 161 is connected to the furnace walls (the heat exchanger tubes 141 and the fins 142) by welding. In addition, the heat exchanger 102 is provided with a plurality of cooling pipes 171 as hanging tools along the vertical direction The lower end portions thereof are connected to the heat exchanger tube 134a of the evaporator 134 and the upper end portions thereof are supported by the beam member 161 and, subsequently, are connected to the water supply pipe 157. The two superheaters 132 and 133 and the evaporator 134 are hung from and supported by the plurality of cooling pipes 171 via hanging metal fittings 132b, 133b, and 143b. The economizer 131 is placed on and supported by a support plate 131b fixed to the furnace walls (the heat exchanger tubes 141 and the fins 142) by welding.

That is, the temperature of the heat exchanger 102 is increased toward the lower portion thereof close to the gasification furnace 101, and thus it is more difficult to retain welding durability. Therefore, the two superheaters 132 and 133 and the evaporator 134 positioned on the lower side are hung from the beam member 161 on the upper side via the plurality of cooling pipes 171, and the economizer 131 positioned on the upper side is placed on the support plate 131b welded to the furnace walls.

Note that the operations of the coal gasification apparatus 14 of the present embodiment are the same as those of the first embodiment, and thus the description thereof will not be repeated.

In the gasification apparatus of the second embodiment as described above, the upper portion of the gasification furnace 101 and the lower portion of the heat exchanger 102 are connected to each other by the connection portion 103, the economizer 131, the superheaters 132 and 133, and the evaporator 134 are arranged in the heat exchanger 102. The superheaters 132 and 133 and the evaporator 134 are hung from and suspended by the beam member 161 fixed to the upper end wall portion via the cooling pipes 171. Therefore, since the superheaters 132 and 133 and the evaporator 134, which are close to the gasification furnace 101 and thus are disposed in a relatively high temperature region, are suspended from and supported by the upper end wall portion, heat damage of the support portions of the superheaters 132 and 133 and the evaporator 134 can be suppressed.

In this case, the heat exchanger tube 134a of the evaporator 134 is connected to the cooling pipes 171. Therefore, by using the cooling pipes 171 as the hanging tools, the hanging metal fittings 132b, 133b, and 134b of the superheaters 132 and 133 and the evaporator 134 can be cooled by the cooling water, and thus heat damage of the support portions can be suppressed. In addition, since the heat exchanger tube 134a of the evaporator 134 is connected to the cooling pipes 171, an additional cooling water source or cooling pipes do not need to be provided. Consequently, an increase in the manufacturing cost can be suppressed.

Third Embodiment

Figure 5:
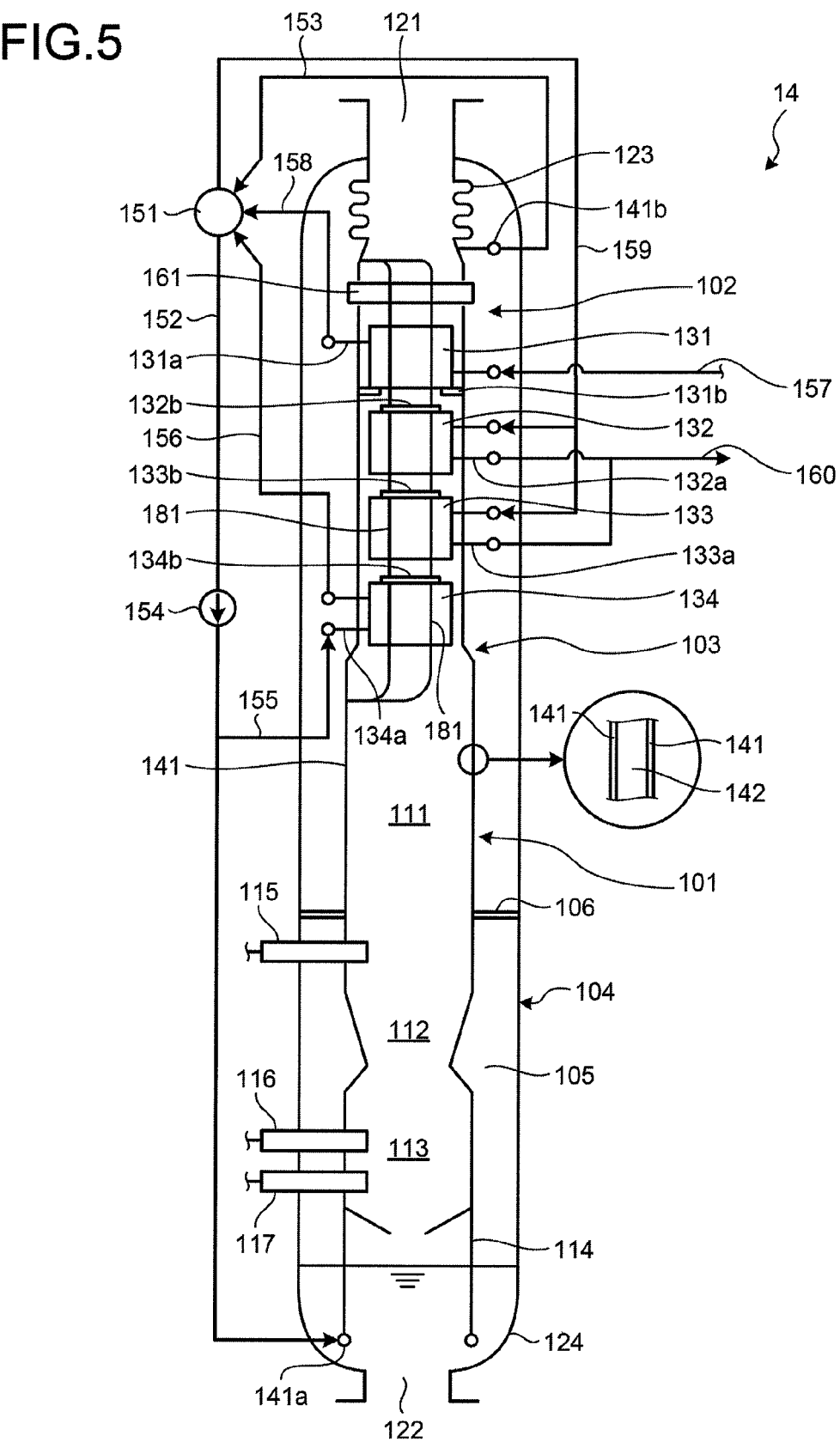
FIG. 5 is a schematic view illustrating a gasification apparatus according to a third embodiment of the present invention.

FIG. 5 is a schematic view illustrating a gasification apparatus according to a third embodiment of the present invention. Note that like elements having the same functions as those of the above-described embodiments are denoted by like reference numerals, and the detailed description thereof will not be repeated.

In the third embodiment, as illustrated in FIG. 5, in a coal gasification apparatus 14, a gasification furnace 101 and a heat exchanger 102 are configured to be connected to each other by a connection portion 103. The gasification furnace 101 includes the reductor portion 111 having an octagonal hollow cross-sectional shape, a diffuser portion 112, and a combustor portion 113 having a triacontadigonal hollow cross-sectional shape. The upper portion of the reductor portion 111 having the regular octagon shape in the gasification furnace 101 and the lower portion of the heat exchanger 102 having a square shape are connected to each other by the connection portion 103, and passage walls 101a and passage walls 102a (see FIG. 2) are parallel to each other.

In the heat exchanger 102, a beam member 161 is disposed above an economizer 131, and the end portion of the beam member 161 is connected to the furnace walls (heat exchanger tubes 141 and fins 142) by welding. In addition, the heat exchanger 102 is provided with a plurality of cooling pipes 181 as hanging tools along the vertical direction. The lower end portions thereof are connected to the heat exchanger tubes 141 included in the furnace walls and the upper end portions thereof are supported by the beam member 161, and are then connected to the heat exchanger tube 141 again. Two superheaters 132 and 133 and an evaporator 134 are hung from and supported by the plurality of cooling pipes 181 via hanging metal fittings 132b, 133b, and 134b. In addition, the economizer 131 is placed on and supported by a support plate 131b fixed to the furnace walls (the heat exchanger tubes 141 and the fins 142) by welding.

In the gasification apparatus of the third embodiment as described above, the upper portion of the gasification furnace 101 and the lower portion of the heat exchanger 102 are connected to each other by the connection portion 103. The economizer 131, the superheaters 132 and 133, and the evaporator 134 are arranged in the heat exchanger 102, and the superheaters 132 and 133 and the evaporator 134 are hung from and suspended by a beam member 161 fixed to the upper end wall portion via the cooling pipes 181. Therefore, since the superheaters 132 and 133 and the evaporator 134, which are close to the gasification furnace 101 and thus are disposed in a relatively high temperature region, are suspended from and supported by the upper end wall portion, heat damage of the support portions of the superheaters 132 and 133 and the evaporator 134 can be suppressed.

In this case, the heat exchanger tubes 141 included in the furnace walls are connected to the cooling pipes 181. Therefore, by using the cooling pipes 181 as the hanging tools, the hanging metal fittings 132b, 133b, and 134b of the superheaters 132 and 133 and the evaporator 134 can be cooled by the cooling water, and thus heat damage of the support portions can be suppressed. In addition, since the heat exchanger tubes 141 are connected to the cooling pipes 181, an additional cooling water source or cooling pipes do not need to be provided. Consequently, an increase in the manufacturing cost can be suppressed.

Note that, in the above-described embodiments, the cooling pipes 162, 171, and 181 are disposed as the hanging tools in the heat exchanger 102, and the water supply pipe 157 to the economizer 131, the heat exchanger tube 134b of the evaporator 134, and the heat exchanger tubes 141 included in the furnace walls are connected thereto. However, the embodiments are not limited to the configurations. That is, without additionally providing the cooling pipes 162, 171, and 181, the water supply pipe 157 to the economizer 131 may be extended, or the arrangement of a part of the heat exchanger tube 134b of the evaporator 134 or the heat exchanger tubes 141 included in the furnace walls may be changed for installation.

Furthermore, in the above-described embodiments, coal is used as the fuel. However, high-grade coal or low-grade coal may also be applied. In addition, the fuel is not limited to the coal, and biomass used as renewable organic resources derived from organisms may also be applied. For example, lumber from thinning, waste lumber, driftwood, grass, waste products, sludge, and tire and recycled fuels (pellets or chips) containing these as the raw materials may also be used.

REFERENCE SIGNS LIST

11 COAL FEEDING APPARATUS
12 FLUIDIZED BED DRYING APPARATUS
13 COAL PULVERIZER
14 COAL GASIFICATION APPARATUS
15 CHAR RECOVERY UNIT
16 GAS REFINING APPARATUS
17 GAS TURBINE FACILITY
18 STEAM TURBINE FACILITY
19 GENERATOR
20 HEAT RECOVERY STEAM GENERATOR
101 GASIFICATION FURNACE
102 HEAT EXCHANGER
103 CONNECTION PORTION
104 PRESSURE CONTAINER
111 REDUCTOR PORTION
112 DIFFUSER PORTION
113 COMBUSTOR PORTION
115, 116, 117 BURNER
123 EXPANSION JOINT
124 SLAG HOPPER
131 ECONOMIZER (HEAT EXCHANGE UNIT)
132, 133 SUPERHEATER (HEAT EXCHANGE UNIT)
134 EVAPORATOR (HEAT EXCHANGE UNIT)
141 HEAT EXCHANGER TUBE
142 FIN
151 STEAM DRUM
152 DESCENDING PIPE
153 ASCENDING PIPE
157 WATER SUPPLY PIPE
159 STEAM PIPE
161 BEAM MEMBER
162, 171, 181 COOLING PIPE

The invention claimed is:

1. A gasification apparatus that produces a gas fuel by burning and gasifying a fuel, comprising:
 a gasification furnace having a polygonal hollow cross-sectional shape with six or more vertices;
 a heat exchanger which is disposed above the gasification furnace and has a quadrangular hollow cross-sectional shape; and
 a connection portion which connects an upper portion of the gasification furnace to a lower portion of the heat exchanger such that the connection portion transitions from the polygonal hollow cross-sectional shape into the quadrangular hollow cross-sectional shape,
 wherein at least two wall portions are included in the gasification furnace and are arranged so as to be parallel to two wall portions included in the heat exchanger.

2. The gasification apparatus according to claim 1, wherein a pressure container having a hollow shape is disposed on outsides of the gasification furnace, the connection portion, and the heat exchanger, and
 an outer surface of the gasification furnace is supported by an inner surface of the pressure container.

3. The gasification apparatus according to claim 2, wherein an upper end portion of the heat exchanger is connected to the pressure container by an expansion joint, and
 a lower end portion of the gasification furnace is sealed by stored water of a slag hopper provided in the pressure container.

4. The gasification apparatus according to claim 1, wherein the gasification furnace, the connection portion, and the heat exchanger are configured to include a plurality of heat exchanger tubes in which wall portions extend in a vertical direction and are arranged in a row in a circumferential direction.

5. The gasification apparatus according to claim 1, wherein the heat exchanger has a plurality of heat exchange units arranged along a vertical direction, and
 at least the heat exchange unit disposed at the lowest position is hung from and supported by a beam member fixed to an upper end wall portion of the heat exchanger via a hanging tool.

6. The gasification apparatus according to claim 5,
   wherein the hanging tool is configured to include cooling pipes through which a cooling medium flows.

7. The gasification apparatus according to claim 6,
   wherein the heat exchange units include an economizer, a superheater, and an evaporator, and
   the cooling pipes include a water supply pipe to the economizer, a heat exchanger tube of the evaporator, or a heat exchanger tube that forms the wall portions.

8. The gasification apparatus according to claim 1, further comprising:
   a reductor portion;
   a diffuser portion; and
   a combustor portion.

9. The gasification apparatus according to claim 8,
   wherein the reductor portion is disposed above the diffuser portion, and the diffuser portion is disposed above the combustor portion.

10. The gasification apparatus according to claim 8,
    wherein a pressure container having a hollow shape is disposed on outsides of the gasification furnace, the connection portion, and the heat exchanger, and
    an outer surface of the gasification furnace is supported by an inner surface of the pressure container.

* * * * *